Nov. 13, 1951     L. D. ROUNDS ET AL     2,575,235
VEGETABLE GATHERER
Filed Sept. 30, 1948     2 SHEETS—SHEET 2
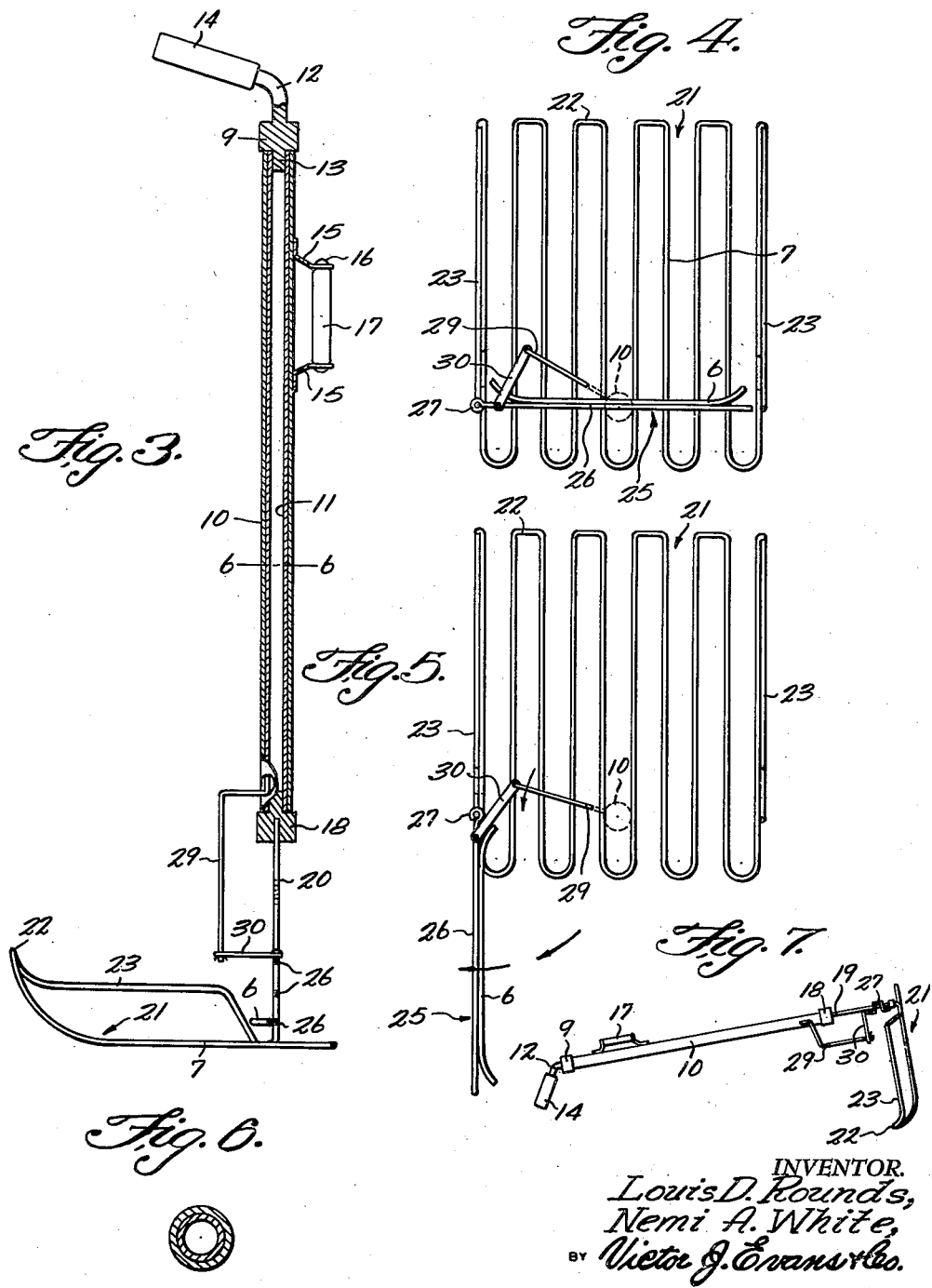
INVENTOR.
Louis D. Rounds,
Nemi A. White,
BY Victor J. Evans & Co.
ATTORNEYS Patented Nov. 13, 1951

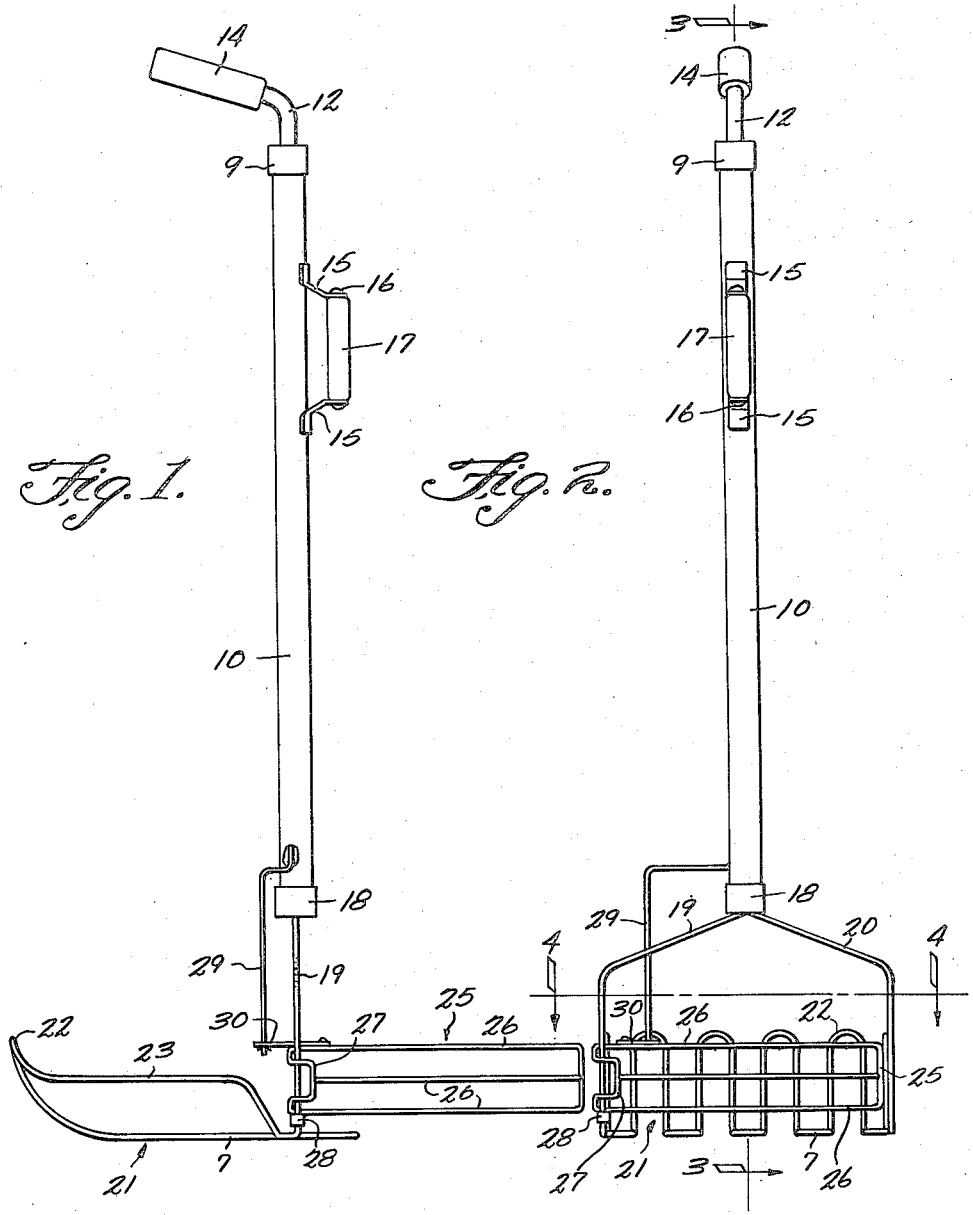

2,575,235

UNITED STATES PATENT OFFICE 2,575,235

VEGETABLE GATHERER

Louis D. Rounds and Nemi A. White,
Toledo, Ohio

Application September 30, 1948, Serial No. 51,944

1 Claim. (Cl. 56—327)

1

This invention relates to a device for picking up potatoes.

An object of the invention is to provide a device that will enable the user to pick up potatoes from the ground without any stooping on the part of the user.

Another object of the invention is to provide a device for quickly and easily picking up and dumping potatoes without imposing a strain on the user's back.

A further object of the invention is to provide a device for picking up potatoes which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational view of the device for picking up potatoes according to the present invention;

Figure 2 is a front elevational view of the device, with the swinging door in closed position;

Figure 3 is a sectional view taken on the line 3—3 of Figure 2;

Figure 4 is a view taken on the line 4—4 of Figure 2;

Figure 5 is a view similar to Figure 4, but showing the swinging door in open position;

Figure 6 is a sectional view taken on the line 6—6 of Figure 3;

Figure 7 is a view showing the position of the device for dumping potatoes into a suitable receptacle.

Referring in detail to the drawings, the numeral 10 designates a hollow, elongated handle fabricated of a suitable metal, such as aluminum. Extending longitudinally in the hollow handle 10 and rotatably mounted therein is a hollow, open-ended shaft 11. A gripping handle 12 is provided with a shoulder 9 which abuts the ends of the handle 10 and shaft 11, and the handle 12 also includes a projection 13 which registers with an open end of the shaft 11 and is secured thereto. The gripping handle 12 has a resilient casing 14 thereon for insuring a better gripping action by the user. A pair of apertured lugs 15 have their ends secured, as by welding, to the handle 10, and a pin 16 mounted transversely on the other end of the lugs carries a rotatable rubber handle 17 for causing rotary movement of the elongated handle 10.

Projecting into the other open end of the hollow shaft 11 and secured thereto, as by welding, is a

2 plug 18 which has secured thereto a pair of spaced, opposed arms 19 and 20. The arms 19 and 20 are secured to the screen, indicated broadly by the numeral 21. The screen 21 comprises a plurality of U-shaped, spaced, parallel rods or wires 7 having their forward ends secured together and bent upwardly, as at 22. The screen 21 is also provided with a bar 23 arranged above and on each side of the screen for coacting with the bent ends 22 to hold potatoes on the screen.

For moving potatoes onto the screen, a rectangularly-shaped swinging door 25 is provided and embodies a plurality of spaced, parallel bars or wires 26. One end of the swinging door 25 is bent to define a hinge 27 which rotatably receives the lower portion of the arm 19 to permit swinging movement of the door 25. Secured to the lowermost of the bars 26 of the door 25 is a curved or arcuate strap 6 which guides the potatoes onto the screen 21 when the door 25 is moved toward the latter.

A spacing element 28 is rotatably mounted on arm 19 between the door 25 and screen 21 and maintains the door in spaced relation above the rods 7 of the screen 21 and permits the door 25 to swing freely above the screen.

For causing swinging movement of the door 25, a first link 29 has one end secured, as by welding, to the hollow handle 10, and its other end pivotally connected to one end of a second link 30. The other end of the second link 30 is pivotally connected to the door 25.

In use, with potatoes arranged on the ground, the device is positioned so that the rods 7 of the screen 21 are in superposed relation with respect to the ground, the swinging door being open, as in Figure 1. To pick up the potatoes the user grips the handle 14 with the left hand to hold the device stationary, and grips the handle 17 with the right hand. By moving the handle 17 in a counter-clockwise direction, the hollow handle 10 is rotated to thereby actuate the linkage 29 and 30 to swing the door 25 toward the screen 21. This swinging movement of the door 25 forces the potatoes onto the rear open end of the screen 21, the door being shown in closed position in Figures 2 and 4. To dump the potatoes from the screen, the device is lifted to the position illustrated in Figure 7, so that the potatoes will tumble off the back end 22 of the screen 21 into a suitable basket or container.

We claim:

In a device for picking up potatoes, a hollow handle, a shaft rotatably mounted in said handle, manually-operable means connected to said handle for rotating said handle, a plug connected to one end of said shaft, a pair of spaced, opposed arms secured to said plug, a screen arranged at right angles with respect to said arms and secured to the latter, a door operatively connected to one of said arms and mounted for swinging movement about the latter above the screen, means for operatively connecting said door to said handle, said last-named means comprising a first link having one end secured to said handle, a second link having one end pivotally connected to the other end of said first link and its other end pivotally connected to said door, means on said screen for holding potatoes on the latter, and an arcuate potato guiding strap carried by said door.

LOUIS D. ROUNDS.
NEMI A. WHITE.

REFERENCES CITED

The following references are of record in the file of this patent:

UNITED STATES PATENTS

| Number | Name | Date |
|---|---|---|
| 72,294 | Hignutt | Dec. 17, 1867 |
| 144,850 | Kaestner | Nov. 25, 1873 |
| 507,826 | Miller | Oct. 31, 1893 |
| 515,852 | Armstrong | Mar. 6, 1894 |
| 908,208 | Crawford | Dec. 29, 1908 |
| 973,539 | Milliken | Oct. 25, 1910 |
| 1,108,270 | Staples | Aug. 25, 1914 |
| 1,541,839 | Metzler | June 16, 1925 |
| 2,034,426 | Bochenek | Mar. 17, 1936 |
| 2,135,232 | Dawn | Nov. 1, 1938 |
| 2,189,565 | Jones | Feb. 6, 1940 |
| 2,427,486 | Wyland | Sept. 16, 1947 |

FOREIGN PATENTS

| Number | Country | Date |
|---|---|---|
| 162,556 | Great Britain | May 5, 1921 |